Dec. 27, 1932.   J. J. EUKEN   1,892,207
RIM AND LUG FOR TRACTION WHEELS
Filed March 21, 1932
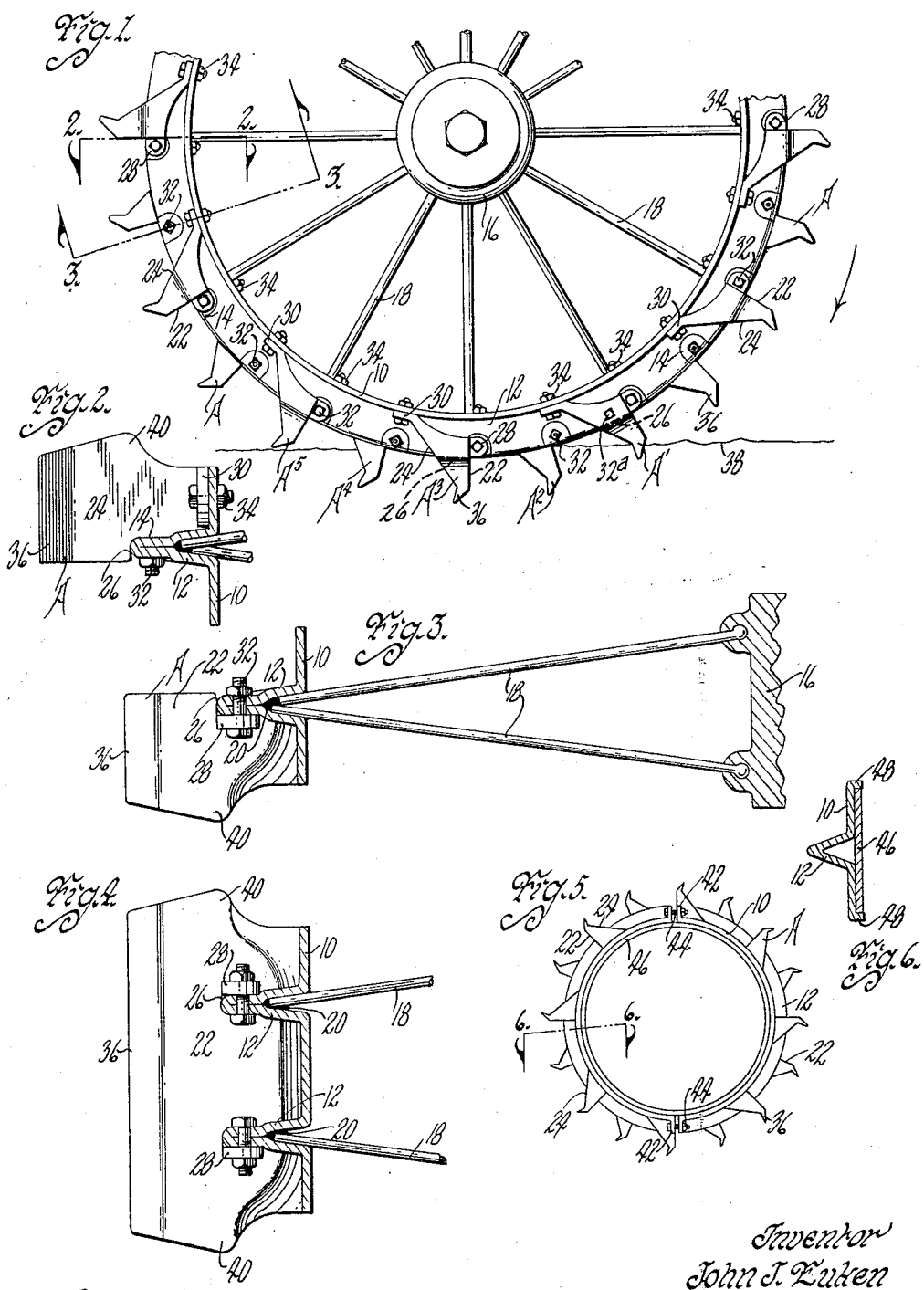
Inventor
John J. Euken
by Bair, Freeman & Sinclair
Attorneys
Witness
Edw. Seeley Patented Dec. 27, 1932

1,892,207

UNITED STATES PATENT OFFICE

JOHN J. EUKEN, OF CUMBERLAND, IOWA

RIM AND LUG FOR TRACTION WHEELS

Application filed March 21, 1932. Serial No. 600,290.

The object of my invention is to provide a rim divider and lug for traction wheels which are simple, durable and comparatively inexpensive to manufacture.

A further object of my invention is to provide a traction wheel construction in which a rim has a divider rib therearound and traction lugs are secured to the rim and divider, the traction lugs being of novel construction and very effective for traction purposes on all kinds of ground surfaces.

A further object is to provide a rim with a divider rib to wedge into the ground surface as the traction wheel travels thereover and prevent side slipping, especially on side hills and to also serve the purpose of pushing the soil under the traction lugs.

A further object is to provide traction lugs of such shape that they come down on the ground at but a slight angle thereto, somewhat similar to the way a horse's foot engages the ground, during the rotation of the wheel and tend to hold up the load instead of allowing the traction wheel to sink into the ground. They also are more effective in lifting and pushing the tractor when they assume a position under the axle and they come out of the ground in much cleaner condition than the ordinary type of flat radial lug.

A further object is to provide traction lugs which have substantially vertical front faces and upwardly and rearwardly slanting rear faces when the lugs assume a position directly under the axle of the traction wheel and to prevent packing of the ground as well as accomplish the desirable results enumerated in the last object.

Another object is to provide lugs which engage the ground-surface with maximum traction effect and prevent scraping and slipping.

Another object is to provide a traction lug which engages the periphery of the divider rib so that the weight imposed on the lug during rotation will be transmitted to the rib, the rib itself serving to reinforce the rim of the wheel.

Another object is to provide my invention in either the form of a traction wheel or an attachment which can be attached to any existing type of traction wheel.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a traction wheel embodying my invention.

Figures 2 and 3 are sectional views on the lines 2—2 and 3—3 respectively of Figure 1.

Figure 4 is a view similar to Figure 3 showing a wider rim with a double divider rib.

Figure 5 is a diagrammatic view showing a rim, divider rib and traction lugs applied to an existing type of traction wheel; and Figure 6 is a sectional view on the line 6—6 of Figure 5.

On the accompanying drawing, I have used the reference numeral 10 to indicate a rim. The rim 10 has a V-shaped divider rib 12 extending therearound. The rib 12 at peripherally spaced points is provided with depressions 14, the purpose of which will hereinafter be fully disclosed.

The traction wheel further includes a hub 16 and spokes 18 extending therefrom. The ends of the spokes 18 enter the divider rib 12 and are secured therein, as for instance by welding indicated at 20.

Lugs A are secured to the rim and divider rib and each lug has the following characteristics. Referring to the lug A3 directly under the hub 16 in Figure 1, it will be noted that it has a vertical front face 22 and an upwardly and rearwardly slanting rear face 24. The words "vertical", "upwardly" and "rearwardly" etc. are used relatively inasmuch as the positions of the lugs change during the rotation of the wheel. The lug A has a shoulder 26 engaging the periphery of the divider rib 12 (see Figure 2).

The lug also has ears 28 and 30 for attachment purposes. The ear 28 is attached by a bolt 32 to the divider rib 12 in one of the depressions 14 thereof. The ear 30 is attached to the rim 10 by a bolt 34. The terminal ends of the lugs A are rearwardly hooked, as indicated at 36.

Referring to Figure 1, lugs A1, A2, A3, A4 and A5 are designated. It will be noted that the terminal end 36 of the lug A1 is entering the ground, the surface of which is indicated at 38. This tends to increase the efficiency of the traction and it will also be noted that the rear face 24 is at but a slight angle to the ground surface, thereby having a tendency to lift the traction wheel even when in the position of the lug A2. When in the position of the lug A3 there is still a lifting tendency because of the angle of the face 24 to the vertical, while in the positions of A4 and A5, the face 24 assumes more nearly vertical positions for readily pulling the lug from the ground without excessive friction or tearing up of the ground surface. The divider rib 12 being of V or wedge shape tends to wedge into the ground and prevent side slipping as well as force the soil to a better position for tractive engagement of the lugs A therewith. The degree of wedging and also entering of the lugs in the ground will, of course, depend on soil conditions, the weight of the tractor, etc.

Referring to Figures 2 and 3, it will be noted that the central portion 40 of the lug is widened beyond the rim 10. This increases the traction effect without the necessity of providing a wide rim for the traction wheel.

Referring to the lug A1 in Figure 1, it will be noted that I have shown a bolt 32a. This may be used in addition to or in place of the bolt 32 if desired.

In Figure 4 I have shown how an especially wide rim can be constructed with a double divider rib and a lug extending completely across the rim and connected with both divider ribs.

In Figure 5 I have shown how the rim, divider rib and lugs can be assembled by themselves in two different units having flanges 42 connected by clamping bolts 44. This arrangement makes it possible to mount my invention on a tractor rim 46. The sectional view Figure 6 shows how the rim 10 coacts with the rim 46. The bolts 34 in this attachment arrangement can be countersunk so as not to interfere with the rim 46 and the rim 10 may be provided with flanges 48 to prevent sidewise dislodgment of the rim 10 from the rim 46.

Some changes such as a change in the size or shape of the hooked portion 36 of the lug A may be made in the construction and arrangement of the parts of my device without departing from the real spirit and purpose of my invention. It is therefore my intention to cover by my claims, any modified forms of structure or use of mechanical equivalents, which may be reasonably included within their scope.

I claim as my invention:

1. In a traction wheel construction, a cylindrical rim having a circumferentially extending raised divider rib therearound and traction lugs on said rim and divider rib, each traction lug comprising a blade having an upwardly and rearwardly slanting rear face and a substantially vertical front face when said lug is beneath the axle of said traction wheel, said lug having an attaching ear at its forward edge attached to said divider rib and an attaching ear at its rear edge attached to said rim.

2. In a traction wheel construction, a cylindrical rim having a circumferentially extending raised divider rib therearound and traction lugs on said rim and divider rib, each traction lug comprising a blade having an upwardly and rearwardly slanting rear face and a substantially vertical front face when said lug is beneath the axle of said traction wheel, said lug having an attaching ear at its forward edge attached to said divider rib and an attaching ear at its rear edge attached to said rim and having a shoulder engaging said divider rib whereby engagement of the lug with a ground surface is transmitted to the rib.

3. In a device of the class described, a cylindrical rim having a circumferentially extending raised divider rib therearound and traction lugs on said rim, each lug having a shoulder adjacent the front face of the lug and engaging the periphery of the divider rib, means adjacent said shoulder attaching said lug to said divider rib and means attaching the rear edge of said lug to the periphery of said rim.

4. In a device of the class described, a cylindrical rim having a circumferentially extending raised divider rib therearound and traction lugs on said rim, said lugs being substantially triangular shaped in side elevation, each lug having one of its corners secured to the periphery of the divider rib, another corner attached to the periphery of said rim and the third corner constituting a ground engaging edge.

JOHN J. EUKEN.